United States Patent [19]

Misherghi et al.

[11] Patent Number: 4,563,548
[45] Date of Patent: Jan. 7, 1986

[54] METHOD AND CIRCUIT FOR TELEPHONE DIALING SIGNAL GENERATION

[75] Inventors: Ayoub H. Misherghi, San Jose; Russell J. Apfel, Los Gatos; Arthur F. Lange, Sunnyvale, all of Calif.

[73] Assignee: Advanced Micro Devices, Inc., Sunnyvale, Calif.

[21] Appl. No.: 598,649

[22] Filed: Apr. 10, 1984

[51] Int. Cl.$^4$ ............................................. H04M 1/26
[52] U.S. Cl. .................................. 179/84 VF; 328/27; 307/261; 364/721
[58] Field of Search ................... 179/84 VF; 364/721, 364/718; 328/27, 114; 307/261, 263

[56] References Cited

U.S. PATENT DOCUMENTS 4,061,886 12/1977 Callahan, Jr. et al. ........ 179/84 VF

Primary Examiner—James L. Dwyer
Attorney, Agent, or Firm—Patrick T. King; J. Vincent Tortolano

[57] ABSTRACT

A method for approximating signals having sinusoidal waveforms with signals having trapezoidal waveforms, and a circuit for generating digital dual-tone multi-frequency (DTMF) dialing signals. The trapezoidal waveforms have sloped portions each equal in duration to one third of a period, and flat portions each equal in duration to one sixth of the period. DTMF dialing signals are generated by forming two such trapezoidal waveforms. The circuit forms trapezoidal waveforms by a computational technique. A periodic triangular waveform is first formed by repetitiously adding and subtracting an incremental value at a succession of time intervals. Then, the peaks of the triangular waveform are truncated to form the trapezoidal waveform.

29 Claims, 10 Drawing Figures

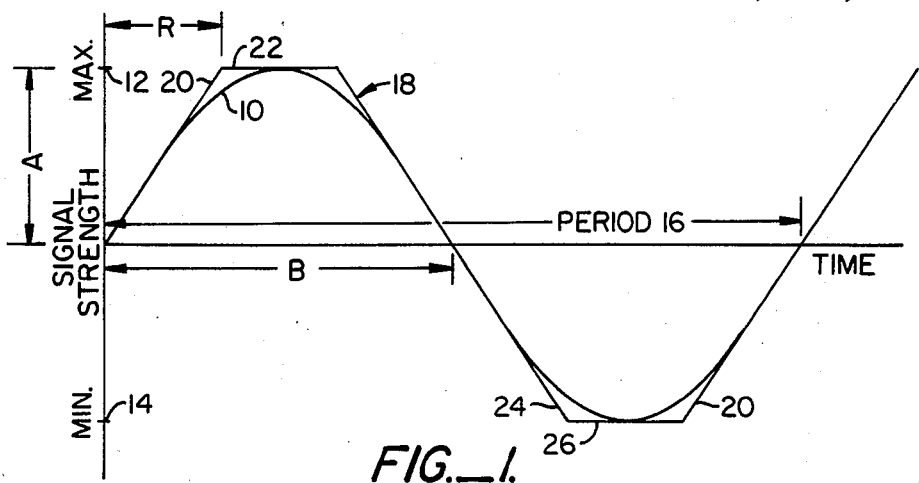
FIG._1.
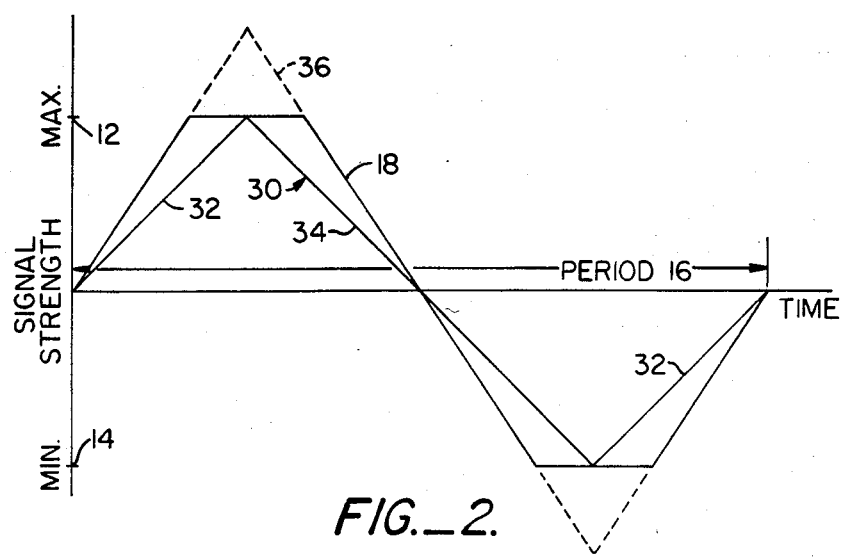
FIG._2.
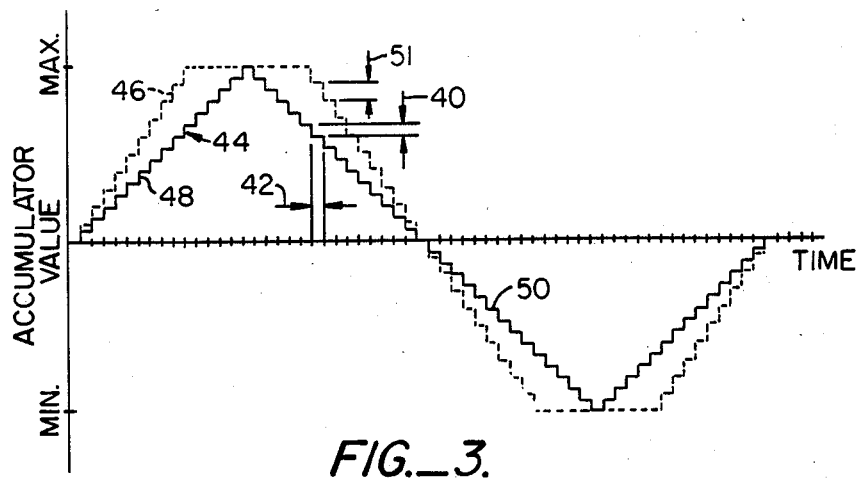
FIG._3.

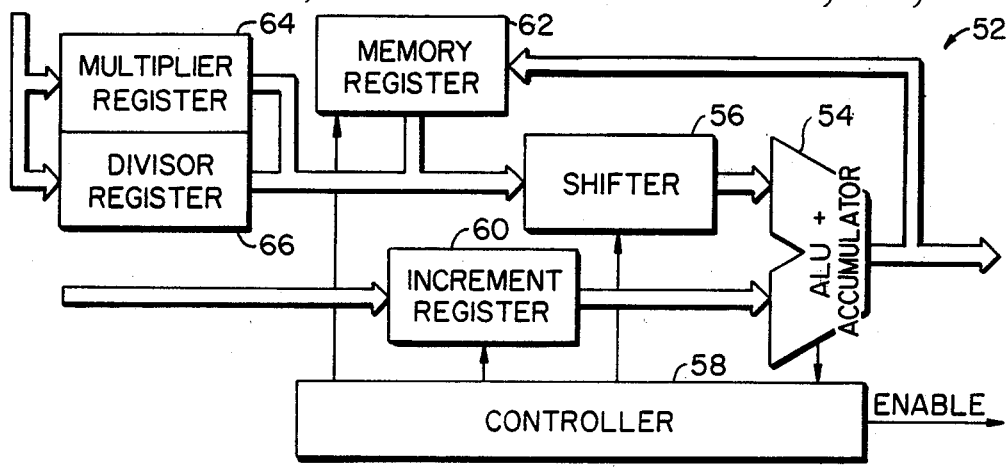
FIG._4.
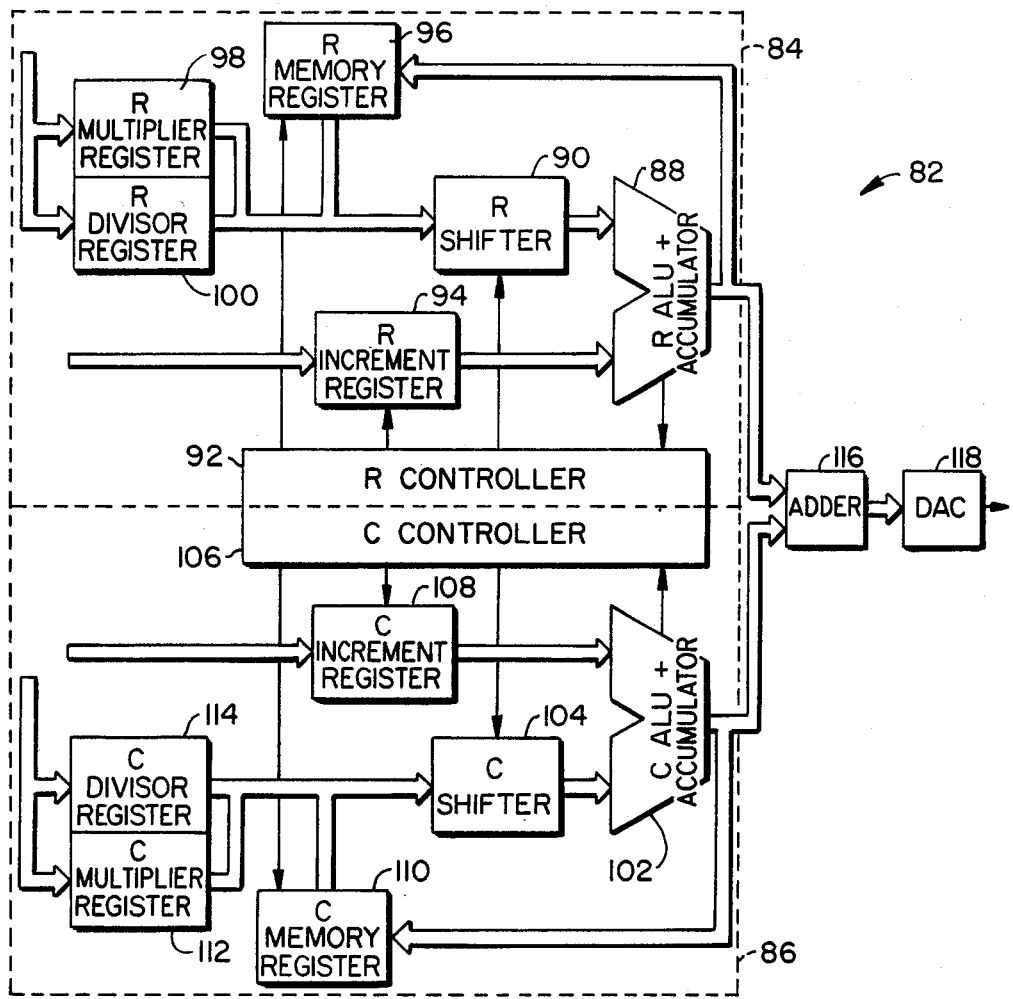
FIG._8.

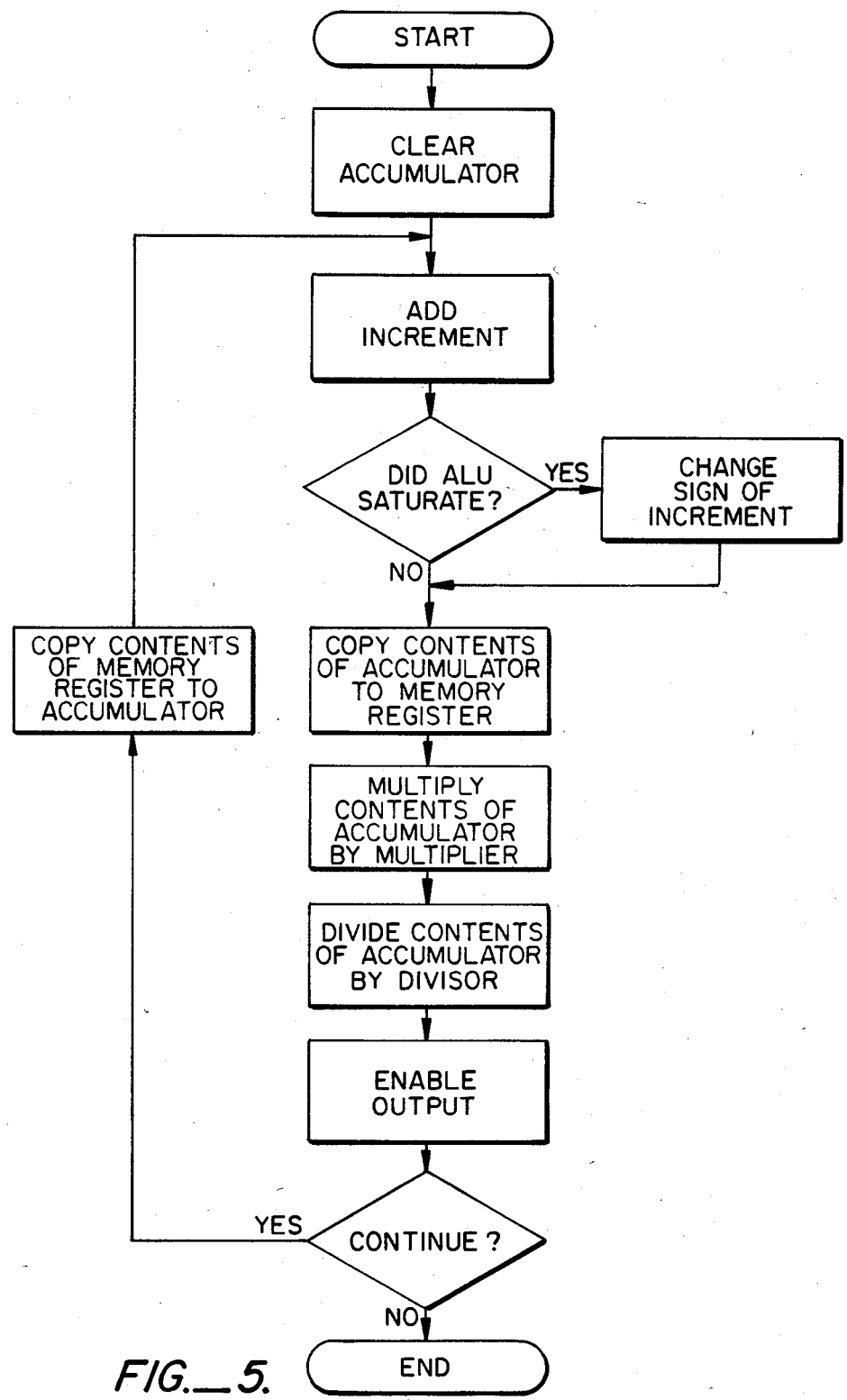
FIG._5.

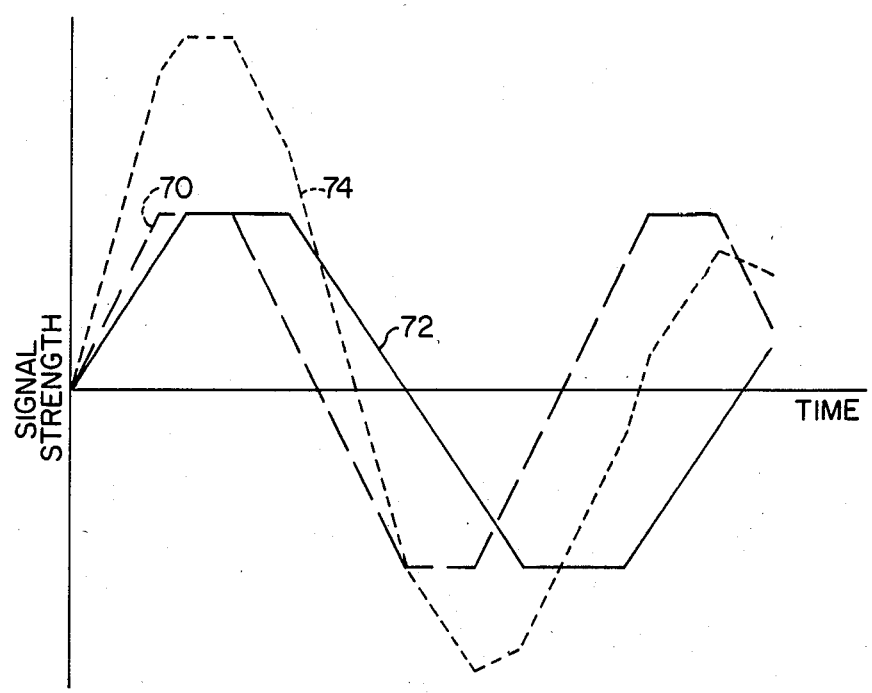
FIG._6.
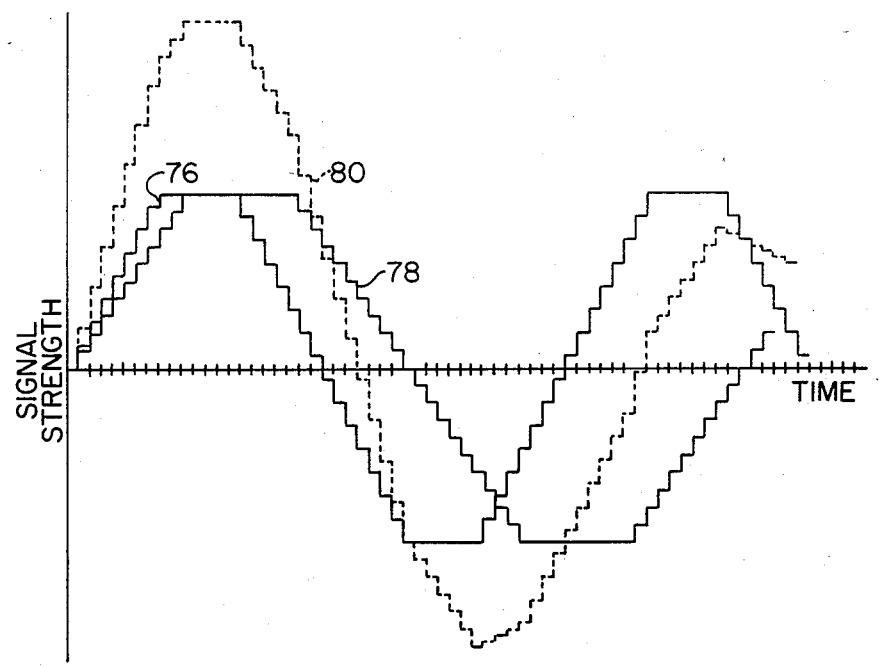
FIG._7.

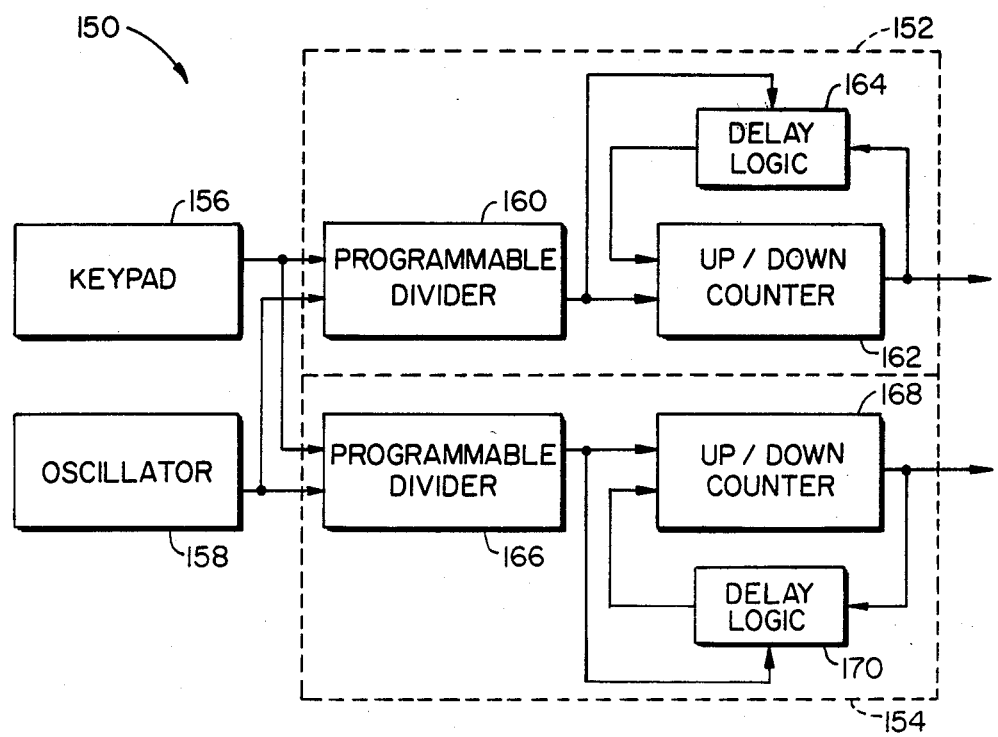
FIG._9.
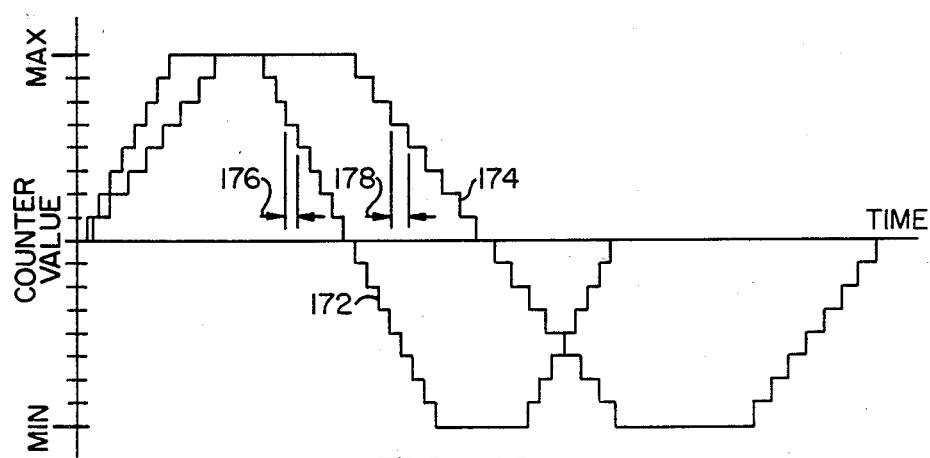
FIG._10.

METHOD AND CIRCUIT FOR TELEPHONE DIALING SIGNAL GENERATION

BACKGROUND OF THE INVENTION

1. Field of the Invention

This invention relates generally to dual-tone multi-frequency (DTMF) telephone dialing systems, and relates more particularly to a method for approximating sinusoidal waveforms with trapezoidal waveforms, and to a general purpose digital processor adapted for generating DTMF dialing signals.

2. Description of the Prior Art

Touch-Tone and other tone dialing telephones utilize dual-tone multi-frequency (DTMF) dialing signals. Dual-tone multi-frequency (DTMF) dialing signals are composed of two simultaneous signals having sinusoidal waveforms of different frequencies. Each key on a telephone keypad is designated by a combination of two sinusoidal waveforms. The lower frequency sinusoidal waveform corresponds to one of four rows on the telephone keypad, and the higher frequency sinusoidal waveform corresponds to one of three columns on the telephone keypad. A fourth column frequency is provided for future use, bringing the total number of frequencies to eight. Since all of the frequencies are within the audible range, the sinusoidal waveforms are also known as tones. Together, two tones designate one key of the keypad.

DTMF tone generators are utilized in telephone systems to generate DTMF dialing signals. A DTMF tone generator is coupled to the keypad to receive information regarding key closures, and is capable of generating combinations of the eight tones. When a telephone key is pressed, two tones are generated by the tone generator, one corresponding to the row of the key and the other corresponding to the column of the key.

In the past, most DTMF tone generators have been analog devices. More recently, digital circuits and digital/analog circuits have been utilized as DTMF tone generators. One typical digital/analog integrated circuit DTMF tone generator is American Microsystems' model S25089 tone generator. The S25089 circuit digitally synthesizes the dialing signals, and then converts them to analog signals. In operation, the circuit divides a high frequency clock signal by a programmable amount, depending upon the key depressed, to provide a timing signal to a counter. The timing signal has a frequency equal to a known multiple of the frequency of the tone to be generated. The counter counts up and down, as clocked by the timing signal, with one full counting cycle defining one period of the synthesized signal. The counter selects taps on a weighted resistor ladder network, which converts the digital output of the counter into an analog voltage signal that approximates a sinusoidal waveform. The S25089 circuit has two parallel tone generator circuits, one for each tone. The signals from each parallel circuit are combined and buffered to generate the DTMF dialing signal.

A major disadvantage of the DTMF tone generators like the S25089 is that they are dedicated circuits with limited flexibility. While such DTMF tone generators do generate dialing signals that meet telephone industry specifications for DTMF dialing signals, that is basically all they can do. Another disadvantage is that they are not readily adaptable to the generation of digital, rather than analog, dialing signals, since they rely on the weighted resistor ladder network to generate signals having approximately sinusoidal waveforms.

General purpose digital processors can be utilized to generate digital DTMF dialing signals. A digital DTMF signal is a time varying digital representation of two simultaneous sinusoidal waveforms. Two computational schemes have been used to generate digital DTMF dialing signals: memory table look-up, and Maclaurin series expansion.

In the memory table look-up method of generating digital DTMF dialing signals, the trigonometric values of one or more sinusoidal waveforms are stored in memory. At each sampling instant, a value is taken from the table and is scaled to produce the digital signal. If the available memory is sufficiently large, full tables for each of the dialing signal frequencies can be stored. Smaller memories may be used, at the cost, however, of increased computation to derive the signal. A major disadvantage to the memory table look-up method is that a memory device of substantial size must be dedicated to DTMF tone generation, as well as a computational device such as a programmable processor. Although some savings in memory size can be achieved, it comes at the cost of increased processor overhead time.

In the Maclaurin series expansion method of generating digital DTMF signals, extensive use of the computational power of a processor is required. At each sampling instant, a value is calculated according to the formula:

$$\cos(x) = 1 - x^2/2! + x^4/4! - x^6/6! + \ldots$$

Alternatively, the value can be calculated from an equivalent sine series. The number of terms used depends upon the time and computational power available and the accuracy required. While this method requires less memory than the table look-up method, it significantly burdens the processor.

SUMMARY OF THE INVENTION

In accordance with the illustrated preferred embodiment, the present invention provides a method for approximating signals having sinusoidal waveforms with signals having trapezoidal waveforms, and a general purpose arithmetic processor adapted for generating digital dual-tone multi-frequency (DTMF) dialing signals.

One aspect of the invention is a method for generating a time varying signal that approximates a signal having a sinusoidal waveform. According to the method of this aspect of the invention, a periodic signal having a trapezoidal waveform of a specified shape is formed. The specified shape provides that the trapezoidal waveform have a positively sloped position equal in duration to one third of a period, a negatively sloped portion also equal in duration to one third of a period, and two flat portions separating the sloped portions, with each flat portion equal in duration to one sixth of the period. The sloped portions are formed by repetitiously adding or subtracting an incremental value during a succession of time intervals. DTMF dialing signals are generated by forming two such trapezoidal waveforms.

Another aspect of the invention is a two-step method for generating a time varying periodic signal that approximates a signal having a sinusoidal waveform. First, a periodic triangular waveform is formed having positively and negatively sloped portions of equal slope.

Then, the peaks of the triangular waveform are truncated to form a trapezoidal waveform with flat portions each substantially equal in duration to one sixth of a period.

A further aspect of the invention is a digital circuit for generating a time varying periodic signal that approximates a signal having a sinusoidal waveform. Specifically, the digital circuitry includes an arithmetic logic unit (ALU) coupled to an accumulator register for addition and subtraction, a shifter for multiplication and division, a controller, and several memory registers holding an incremental value, a multiplier, a divisor, and a triangular waveform value. At a succession of equal time intervals, the circuit first generates a point on a triangular waveform having a period equal to that of the sinusoidal waveform, and then generates a corresponding point on a trapezoidal waveform. A positively sloped portion of the triangular waveform is defined by repetitiously adding the incremental value until the ALU saturates at its maximum value. A negatively sloped portion of the triangular waveform is then defined by repetitiously subtracting the incremental value until the ALU saturates at its minimum value. The trapezoidal waveform is created by multiplying each value of the triangular waveform by the multiplier. ALU saturation truncates the peaks of the triangular waveform. It has been determined that a multiplier equal to one and one-half produces a trapezoidal waveform that best approximates a sinusoid. As a final step, the value of the trapezoidal waveform is attenuated, if so desired, by dividing it by the divisor.

Digital DTMF dialing signals are generated by specifying two incremental values that yield two trapezoidal waveforms having periods substantially equal to the periods of the selected row and column tones. Each incremental value is equal to twice the range of the ALU divided by the number of time intervals in the period of the waveform. Accordingly, the tones generated are determined by their corresponding incremental values. The two trapezoidal waveforms may be generated serially with one processor, or in parallel with parallel processors. After generation, the two trapezoidal waveforms are combined to form a digital DTMF dialing signal.

The present invention has many advantages. One major advantage of the present invention is that signals having sinusoidal waveforms can be closely approximated by signals having digitally synthesized trapezoidal waveforms. Another major advantage is that a general purpose processor circuit is provided that generates signals having trapezoidal waveforms approximating signals having sinusoidal waveforms. Still another major advantage of the present invention is that digital DTMF dialing signals are generated by general purpose, rather than dedicated, circuitry. Digital DTMF dialing signal generation is accomplished without the use of extensive memory, and without extensive computation.

BRIEF DESCRIPTION OF THE DRAWINGS

FIG. 1 is a graphical representation of a signal having a sinusoidal waveform and a signal having a trapezoidal waveform that approximates the sinusoidal waveform.

FIG. 2 is a graphical representation of a method for forming the trapezoidal waveform of FIG. 1.

FIG. 3 is a graphical representation of a digital technique for forming the trapezoidal waveform of FIG. 1.

FIG. 4 is a block diagram of a processor adapted according to the present invention for generating digital DTMF dialing signals.

FIG. 5 is a flow chart of the operation of the processor of FIG. 4.

FIG. 6 is a graphical representation of a DTMF dialing signal and two trapezoidal waveforms that comprise the DTMF dialing signal.

FIG. 7 is a graphical representation of a digital DTMF dialing signal and two digitally generated trapezoidal waveforms that comprise the digital DTMF dialing signal.

FIG. 8 is a block diagram of a parallel processor adapted for generating digital DTMF dialing signals.

FIG. 9 is a block diagram of an alternative circuit adapted for generating digital DTMF dialing signals.

FIG. 10 is a graphical representation of the operation of the circuit of FIG. 9 in generating digital DTMF dialing signals.

DETAILED DESCRIPTION OF THE PREFERRED EMBODIMENTS

The preferred embodiments of the present invention include a method for approximating sinusoidal waveforms with trapezoidal waveforms, and a general purpose arithmetic processor adapted for generating digital dual-tone multi-frequency (DTMF) dialing signals according to the method. First, the method for approximating sinusoidal waveforms with trapezoidal waveforms will be described with reference to FIGS. 1 to 3. Next, the general purpose arithmetic processor will be described with reference to FIGS. 4 and 5. Then, an application of the method to the generation of DTMF dialing signals will be described with reference to FIGS. 6 and 7. A parallel processor adapted for generation of DTMF dialing signals will next be described with reference to FIG. 8. Finally, an alternative digital technique and circuit for generating DTMF dialing signals will be described with reference to FIGS. 9 and 10.

In FIG. 1, a signal having a sinusoidal waveform 10 is shown. Sinusoid 10 has a time varying signal strength that varies sinusoidally with time between maximum and minimum values 12 and 14. Each complete oscillation of the sinusoid defines one period 16. In relation to DTMF dialing signals, sinusoid 10 could be any of the eight DTMF tones.

A signal composed of a periodic trapezoidal waveform 18 can be utilized to approximate sinusoidal waveform 10. Trapezoidal waveform 18 has a positively sloped portion 20 that extends from minimum value 14 up to maximum value 12, followed by a first constant value portion 22 equal to the maximum value, followed by a negatively sloped portion 24 that extends from the maximum value down to the minimum value, and followed by a second constant value portion 26 equal to the minimum value. Since the trapezoidal waveform is periodic, the second constant value portion 26 is followed by another positively sloped portion 20, which is in turn followed by another first constant value portion 22, etc. Although FIG. 1 illustrates the positively sloped portion 20 as two discontinuous segments, it does extend continuously from minimum 14 to maximum 12. FIG. 1 shows only one of several periods of the trapezoidal and sinusoidal waveforms.

Periodic trapezoidal waveform 18 has certain characteristics that make it a fairly good approximation of sinusoid 10. One characteristic is that the period of the trapezoidal waveform is substantially equal to the period 16 of the sinusoidal waveform 10. Another characteristic is that the maximum and minimum values of the trapezoidal waveform are substantially equal to the maximum and minimum values of the sinusoid. A further characteristic is that the magnitude of the slopes of sloped portions 20 and 24 are equal. A still further characteristic is that the time duration of each sloped portion 20 and 24 is substantially equal to one third of period 16, and the time duration of each constant value portion 22 and 26 is substantially equal to one sixth of period 16.

The reason why trapezoidal waveform 18 is such a close approximation to sinusoidal waveform 10 may be shown by expressing the trapezoidal waveform in terms of a Fourier series. In general, a Fourier series can represent a bounded periodic function by a series summation of cosine and sine terms. Since trapezoidal waveform 18 is a bounded periodic function, a Fourier series representation can be formed:

$$F(t) = (4*A*B)/(pi^2*R) * [\sin(pi*R/B) * \sin(pi*t/B) + \\ (1/3^2) * \sin(3*pi*R/B) * \sin(3*pi*t/B) + \\ (1/5^2) * \sin(5*pi*R/B) * \sin(5*pi*t/B) + \\ (1/7^2) * \sin(7*pi*R/B) * \sin(7*pi*t/B) + \\ (1/9^2) * \sin(9*pi*R/B) * \sin(9*pi*t/B) + \\ (1/11^2) * \sin(11*pi*R/B) * \sin(11*pi*t/B) + \ldots]$$

where F(t) is the Fourier series representation of trapezoidal waveform 18, A is amplitude and equals one half of the range from maximum 12 to minimum 14, B equals one half of period 16, R equals one half of the duration of the sloped portion 20 or 24, t equals the variable time, and pi=3.14159.

The Fourier series representation of trapezoidal waveform 18 includes a fundamental sine term, sin (pi*t/B), having a period equal to 2B, which corresponds to sinusoidal waveform 10. The Fourier series also includes sine terms of periods 2B/3, 2B/5, 2B/7, 2B/9, 2B/11, ..., which correspond to higher frequency harmonics of sinusoid 10. If all of the higher frequency harmonic terms of F(t) were equal to zero, then trapezoidal waveform 18 would be an exact representation of sinusoid 10. In reality, the best representation is achieved when the higher frequency harmonic terms are minimized. Since the coefficients of the harmonic terms decrease as their frequencies increase, the contribution of the higher frequency harmonic terms is less than the contribution of the lower frequency harmonic terms. The largest contributor is the sin (3*pi*t/B) term, which has a period of 2B/3 and a frequency of three times that of sinusoid 10. The coefficient of this term is $(\frac{1}{3}^2) * \sin(3*pi*R/B)$. By selecting R to be equal to one third of B, the coefficient of the sin (3*pi*t/B) term is equal to zero. The Fourier series representation then reduces to:

$$F(x) = A * [1.05296 * \sin(x) + 0.00000 * \sin(3x) - \\ .04212 * \sin(5x) + .02148 * \sin(7x) + \\ 0.0000 * \sin(9x) - .00871 * \sin(11x) + \ldots]$$

where x=pi*t/B. Note that the 3x and 9x terms drop out, and that the 5x, 7x, and 11x terms are small in comparison to the fundamental term.

Thus, by selecting R to be equal to one third of B, trapezoidal waveform 18 best represents sinusoid 10. This corresponds to the characteristic described above wherein the duration of each sloped portion is equal to one third of period 16, and the duration of each constant value portion is equal to one sixth of period 16.

FIG. 2 graphically illustrates a method for forming a signal having a trapezoidal waveform. First, a signal with a time varying triangular waveform 30 is generated. The triangular waveform has a period equal to period 16 and a value that varies linearly between maximum value 12 and minimum value 14. It has a positively sloped portion 32 and a negatively sloped portion 34, each with a duration equal to one half of period 16. Next, triangular waveform 30 is expanded by a multiplier to waveform 36. Those portions of waveform 36 that exceed the maximum value are truncated at the maximum value, and those portions of the waveform that are less than the minimum value are truncated at the minimum value, thus forming a trapezoidal waveform. When the multiplier is equal to one and one-half, the resultant waveform is equal to trapezoidal waveform 18 having sloped portions each with a duration of one third of the period and constant value portions each with a duration of one sixth of the period.

FIG. 3 graphically illustrates a digital technique for forming a trapezoidal waveform. An accumulator register is used to hold the values of the triangular and trapezoidal waveforms 44 and 46 at each point in time. The range of the accumulator, which equals its maximum value minus its minimum value, is subdivided into incremental values 40 of substantially equal size. The period of the waveform is subdivided into time intervals 42 of equal duration.

A certain relationship exists between the size of incremental value 40 and the size of time interval 42. Assume that incremental value 40 is equal to a first fraction of the accumulator range, and that time interval 42 is equal to a second fraction of the period. The relationship that exists is that the first fraction equals twice the second fraction. For example, if the time interval is equal to one sixtieth of a period, then the incremental value is equal to one thirtieth of the accumulator range. The relationship arises since the value of the triangular waveform spans the accumulator range twice within one period.

To form triangular waveform 44, incremental value 40 is either added or subtracted at each time interval 42. To form a positively sloped portion 48 of the triangular waveform, the incremental value is repetitiously added to the value of the triangular waveform, once during each successive time interval. After the value of triangular waveform 44 reaches its maximum value, the incremental value is repetitiously subtracted from the value of the triangular waveform, once during each successive time interval, to form a negatively sloped portion 50. After the value of the triangular waveform reaches its minimum value, the incremental value is then repetitiously added to the value of the triangular waveform to form the next positively sloped portion.

To form trapezoidal waveform 46, the triangular waveform is expanded and truncated. Each value of triangular waveform 44 is multiplied by a multiplier equal to one and one-half. The resultant value is truncated so as not to exceed either the maximum or the minimum value of the accumulator.

An alternative technique for forming a trapezoidal waveform, forms the trapezoidal waveform directly. Another incremental value 51 is defined as equal to one and one-half times incremental value 40. If incremental value 40 equals one thirtieth of the accumulator range, then incremental value 51 would equal one twentieth of the accumulator range. Accordingly, the fraction associated with incremental value 51 (one twentieth, for example) is triple the fraction associated with time interval 42 (one sixtieth, for example).

To form a trapezoidal waveform according to this alternative technique, means for defining the constant value portions must be available in addition to means for adding and subtracting. The positively sloped portions of trapezoidal waveform 46 are formed by repetitiously adding incremental value 51 once during each time interval. Correspondingly, the negatively sloped portions are formed by repetitiously subtracting incremental value 51 once during each time interval. The constant value portions may be formed by keeping the waveform value constant for a number of periods equal to one sixth of a period. If there are, for example, sixty time intervals in a period, the constant value portion can be formed be holding the waveform value constant for ten time intervals.

This alternative technique is less attractive because of the complication of forming the constant value portions of the trapezoidal waveform. Although it is more complex, this technique approximates a signal having a sinusoidal waveform by generating a signal having a trapezoidal waveform, according to the method of the present invention.

A general purpose arithmetic processor 52, illustrated in FIG. 4, is adapted for the generation of time varying signals such as trapezoidal waveform 46. Processor 52 includes an arithmetic and logic unit (ALU) and accumulator 54, a shifter 56, a controller 58 and several registers 60, 62, 64, and 66. The ALU is capable of addition and subtraction, and with shifter 56 attached is also capable of multiplication and division. The accumulator is a storage register that holds the result of the latest arithmetic operation performed by the ALU, and can also serve as an input register to the ALU. Controller 58 monitors the ALU and accumulator to detect saturation, and generally controls the operation of the processor. Increment register 60 holds the incremental value that is used to form the triangular waveform. Memory register 62 holds the last calculated value of the triangular waveform. Multiplier register 64 holds a multiplier value that is used to expand the triangular waveform to form the trapezoidal waveform. Divisor register 66 holds a divisor value that is used to attenuate the trapezoidal waveform. The value of the multiplier is normally equal to one and one-half, while the value of the divisor may vary according to the desired signal strength of the output signal. Register 60 is coupled to one input terminal of the ALU, while registers 62, 64, and 66 are coupled through shifter 56 to the other input terminal of the ALU. An output terminal of the ALU issues the output signal, and is also coupled to an input terminal of memory register 62.

To generate a trapezoidal waveform that approximates a sinusoidal waveform, processor 52 operates according to the flow chart illustrated in FIG. 5. First, the accumulator is cleared. Then, the incremental value is added to the value of the accumulator and the result is stored in the accumulator. This result is the current value of the triangular waveform. Next, the ALU is tested for saturation. Positive saturation occurs whenever the result of an arithmetic operation equals or exceeds the maximum value of the ALU, while negative saturation occurs whenever the result is equal to or less than the minimum value of the ALU. When saturation occurs, the value of the accumulator is set to either the maximum or the minimum value, depending upon whether positive or negative saturation occurred. Assuming that the incremental value is less than half of the range of the ALU, the ALU will not saturate during the first time interval. Next, the contents of the accumulator is copied to the memory register to save the value of the triangular waveform.

The value of the trapezoidal waveform is computed next. The contents of the accumulator, which equals the current value of the triangular waveform, are multiplied by the multiplier stored in register 64 to compute the value of the trapezoidal waveform. If the multiplication causes ALU saturation, then the resultant is equal to the maximum value if positive saturation occurred, or is equal to the minimum value if negative saturation occurred. If attenuation of the amplitude of the trapezoidal waveform is desired, the accumulator contents are next divided by the divisor stored in register 66. The contents of the accumulator are now equal to a value of an attenuated trapezoidal waveform at one point in time. Controller 58 now issues an enable signal that signifies that the accumulator contents can now be read by an output circuit. The output circuit (not shown) then reads the contents of the accumulator and generates a corresponding output signal.

All of the above described steps occur within one time interval and generates just one point on the trapezoidal waveform. If additional points of the trapezoidal waveform are not required, then the process ends there. If additional points are required, the value of the trapezoidal waveform is calculated for the next time interval. To do so, the value of the triangular waveform stored in the memory register is copied into the accumulator. The incremental value is then added to compute the next point on the triangular waveform and the ALU is tested for saturation. If saturation occurs, the sign of the increment is changed so that subsequent additions of the increment are actually subtractions. Then the contents of the accumulator are multiplied by the multiplier and divided by the divisor, as described above. This process continues until the controller is directed to stop.

An example may be helpful in explaining the operation of the circuit. Assume that there are sixty time intervals in a period, and that the accumulator swings between a minimum value of $-150$ and a maximum value of $+150$, for a range of 300. The incremental value is equal to one thirtieth of 300, which equals 10. Another way to determine the incremental value is to multiply the range by two and divide by the number of time intervals in a period. Also assume that the accumulator value is equal to zero at the beginning.

Prior to the first time interval, the value of the triangular waveform is equal to zero. At the first time interval, the incremental value is added to the accumulator to increase its value to 10. The ALU is tested for saturation, but this test is negative. The value of 10 is then stored in the memory register. The value of 10 is then multiplied by 1.5, which results in a value of 15 in the accumulator. Assuming that no attenuation is desired, the value of the trapezoidal waveform at the first time interval is thus equal to 15.

At the second time interval, the value of the memory register is copied to the accumulator, and again incremented by 10 to yield a value of 20. The ALU is again tested for saturation, but saturation has not yet occurred. The value of 20 is stored in the memory register and then multiplied by 1.5 to compute 30 as the value of the trapezoidal waveform at the second time interval.

After the ninth time interval, the value stored in the memory register is equal to 90 and the value of the trapezoidal waveform is 135. At the tenth time interval, 10 is added to 90 to yield 100. Saturation has not yet occurred. The value of 100 is stored in the memory register and is multiplied by 1.5. This saturates the ALU at its maximum value of 150. At the eleventh time interval, 10 is added to 100 to yield 110 as the triangular waveform value. The value of 110 is stored in the memory register and is multiplied by 1.5. This again saturates the ALU at its maximum value. Thus, the value of the trapezoidal waveform is equal to 150 as long as the value of the triangular waveform is equal to or greater than 100.

At the fifteenth time interval, 10 is added to 140 to yield 150. This saturates the ALU and causes the sign of the incremental value to change. The value of the trapezoidal waveform is still equal to 150. At the sixteenth time interval, 150 is copied into the accumulator from the memory register. The incremental value is added, but the effect is to subtract 10 from 150 because the sign of the incremental value was changed during the fifteenth time interval. The result is that the triangular waveform value is 140. The value of the trapezoidal waveform remains at 150.

At the twenty-first time interval, −10 is added to 100 to yield a value of 90 for the triangular waveform. The value of the trapezoidal waveform is 1.5 times 90, or 135. Thus, the trapezoidal waveform begins its negatively sloped portion. The negatively sloped portion continues until the fortieth time interval, wherein the trapezoidal waveform reaches the minimum value, −150. The sign of the incremental value is again changed at the forty-fifth time interval. The value of the trapezoidal waveform remains at −150 until the fifty-first time interval, when the positively sloped portion begins. Note that each constant value portion of the trapezoidal waveform lasts for ten time intervals, and that each sloped portion lasts for twenty time intervals.

Having thus described a method for generating a time varying trapezoidal waveform that approximates a sinusoidal waveform, and a general purpose processor adapted for the use of the method, operation of the processor to generate dual-tone multi-frequency (DTMF) dialing signals will now be described. Recall that a DTMF dialing signal comprises two signals having sinusoidal waveforms, each designating a row or column of a telephone keypad. In FIG. 6, trapezoidal waveforms 70 and 72 represent two sinusoidal waveforms comprising a DTMF dialing signal. Each trapezoidal waveform is shaped according to the characteristics of trapezoidal waveform 18 described above. The DTMF dialing signal itself is the sum of waveforms 70 and 72, and is shown as waveform 74 in FIG. 6.

A digital technique for generating digital DTMF dialing signals is graphically illustrated in FIG. 7. Waveforms 76, 78, and 80 respectively correspond to waveforms 70, 72, and 74 of FIG. 6. Trapezoidal waveforms 76 and 78 are generated according to the method described above in reference to processor 52. Waveform 80 is the digital sum of waveforms 76 and 78, and is a digital DTMF dialing signal corresponding to the tones represented by waveforms 76 and 78.

DTMF dialing signals must meet certain specifications as determined by the telephone switching network. Frequencies are to be within 1.5% of nominal tone frequencies. The following table presents the nominal tone frequencies for DTMF tones, and also presents information regarding the implementation of DTMF dialing signal generation according to the present invention. If, for example, a 128 KHz clock is used to define the time intervals (giving each time interval a duration of 7.8125 micro-seconds), and the ALU has a range of 8192 units (a 13 bit design, where $8192 = 2^{13}$), then the incremental values that yield the proper waveform frequencies are as follows:

| Nominal Tone Frequency | Number of Time Intervals @ 128 KHz | Actual Frequency | Frequency Deviation | Incremental Value @ ALU cap. = 8192 |
|---|---|---|---|---|
| 697 Hz | 184 | 695.7 Hz | −0.19% | 90 |
| 770 | 166 | 771.1 | +0.14 | 99 |
| 852 | 150 | 853.3 | +0.16 | 110 |
| 941 | 136 | 941.2 | +0.02 | 121 |
| 1209 | 106 | 1207.5 | −0.12 | 155 |
| 1336 | 96 | 1333.3 | −0.20 | 171 |
| 1477 | 86 | 1488.4 | +0.77 | 191 |
| 1633 | 78 | 1641.0 | +0.49 | 211 |

Note that the actual frequencies of the resultant waveforms are within one percent of the nominal tone frequencies. Once the time interval has been fixed and the ALU range has been determined, each of the eight trapezoidal waveforms is specified by its incremental value. The period of each signal extends for an even number of time intervals so that the positive portion of the signal equals the negative portion. The incremental value for each signal is computed by dividing twice the ALU capacity by the corresponding time interval, and by rounding the result up to the next integer.

The two trapezoidal waveforms that comprise a digital DTMF dialing signal may be generated either in series or in parallel. Processor 52 may be utilized to generate two trapezoidal waveforms in series. To do so, registers 60, 62, 64, and 66 must be capable of storing incremental values, triangular waveform values, multipliers, and divisors, respectively, for both of the trapezoidal waveforms. In such operation, processor 52 would first calculate the value of one trapezoidal waveform, and then calculate the value of the other trapezoidal waveform, all within one time interval. In addition, the ALU could be used to add the two trapezoidal waveforms together to create waveform 80.

FIG. 8 illustrates a parallel processor 82 that includes a row processor 84 and a column processor 86. Processors 84 and 86 are each essentially the same as processor 52 described above. Row processor 84 includes an ALU and accumulator 88, a shifter 90, a controller 92, and registers 94, 96, 98, and 100, all interconnected for operation as in processor 52. Column processor 86 includes an ALU and accumulator 102, a shifter 104, a controller 106, and registers 108, 110, 112, and 114, all interconnected for operation as in processor 52. The output terminals of ALUs 88 and 102 are coupled to input terminals of an adder 116. An output terminal of adder 116 may be coupled to a digital to analog converter (DAC) 118 if analog, rather than digital, DTMF dialing signals are desired.

Processors 84 and 86 each operate independently to generate a trapezoidal waveform. Each waveform is specified according to the incremental values stored in increment registers 94 and 108. Adder 116 sums the waveforms generated by each processor to produce the digital DTMF dialing signals. A parallel processor such as this may be useful if the computational speed of a processor unduly restricts the use of a serial implementation.

An alternative digital technique for generating digital DTMF dialing signals is illustrated in FIGS. 9 and 10. This technique utilizes the same method described above for approximating a sinusoidal waveform with a trapezoidal waveform having sloped portions each equal to one third of a period and flat portions each equal to one sixth of a period. The difference between this technique and the preceding technique is that waveform frequency is determined by an adjustable time interval, rather than by an adjustable incremental value. The value of the trapezoidal waveform is contained in an up/down counter, which defines the duration of the sloped and flat portions of the waveform.

A block diagram of a counter circuit 150 is shown in FIG. 9. The counter circuit includes a row counter circuit 152, a column counter circuit 154, a keypad 156 and an oscillator 158. Row counter circuit 152 includes a programmable divider 160, an up/down counter 162, and delay logic 164. Input terminals of programmable divider 160 are coupled to receive a row signal from keypad 156 and a master clock signal from oscillator 158. An output terminal of programmable divider 160 is connected to a clock input terminal of counter 162 and to an input terminal of the delay logic 164. An output terminal of counter 162 is coupled to an input terminal of delay logic 164, which, in turn, has an output terminal coupled to an enable input terminal of counter 162. Similarly, column counter circuit 154 includes a programmable divider 166, an up/down counter 168, and delay logic 170. Input terminals of programmable divider 166 are coupled to receive a column signal from keypad 156 and the master clock signal from oscillator 158. An output terminal of programmable divider 166 is connected to a clock input terminal of counter 168 and to an input terminal of delay logic 170. An output terminal of counter 168 is coupled to an input terminal of delay logic 170, which, in turn, has an output terminal coupled to an enable input terminal of counter 168.

The shape of the trapezoidal waveforms is determined by the operation of the counters in conjunction with the delay logic circuits. The counter of each counter circuit is clocked by a signal from its corresponding programmable divider. At values between the maximum and minimum counter values, the counters count up or down by one according to the clocking signal. When a counter reaches its maximum or minimum value, the delay logic disenables the counter for one sixth of a period. This forms the flat portions of the trapezoidal waveforms. Once the sixth of a period has elapsed, the counter is enabled and continues its count. Thus the counting operation of the counter comprises counting up from the minimum value to the maximum value, delaying at the maximum value for one sixth of a period, then counting down to the minimum value, delaying at the minimum value for one sixth of a period, then counting up again, etc.

The period, and corresponding frequency, of each waveform is determined by the programmable dividers. Each waveform has a time interval associated with it that equals the waveform period divided by three times the counter range. Since the period of each waveform is different, the time interval of each waveform is different. Shorter time intervals yield shorter periods and higher frequencies. The determination of time intervals is made by the programmable dividers 160 and 166. In response to a key closure, each programmable divider divides the high frequency master clock signal into a lower frequency timing interval signal having a period equal to the time interval of the trapezoidal waveform that corresponds to the key closure. This timing interval signal clocks the corresponding up/down counter to generate a trapezoidal waveform having the correct frequency.

FIG. 10 graphically represents the operation of counter circuit 150. Two trapezoidal waveforms 172 and 174 are generated by counter circuit 150, one by the row counter circuit and the other by the column counting circuit. The timing interval 176 of waveform 172 is smaller than the timing interval 178 of waveform 174. Accordingly, waveform 172 has a higher frequency.

From the above description, it will be apparent that the invention disclosed herein provides a novel and advantageous method for approximating sinusoidal waveforms with trapezoidal waveforms, and a circuit for generating DTMF dialing signals. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for generating a time varying signal that approximates a signal having a sinusoidal waveform, said method comprising the steps of:

forming a positively sloped portion of a periodic trapezoidal waveform, wherein the strength of said signal varies with time from a minimum value to a maximum value, and wherein the duration of said positively sloped portion is substantially equal to one third of the period of said sinusoidal waveform;

forming a first constant value portion of said periodic trapezoidal waveform after said positively sloped portion, wherein the strength of said signal equals said maximum value, and wherein the duration of said first constant value portion is substantially equal to one sixth of said period;

forming a negatively sloped portion of said periodic trapezoidal waveform after said first constant value portion, wherein the strength of said signal varies with time from said maximum value to said minimum value, and wherein the duration of said negatively sloped portion is substantially equal to one third of said period; and forming a second constant value portion of said periodic trapezoidal waveform after said negatively sloped portion, wherein the strength of said signal equals said minimum value, and wherein the duration of said second constant value portion is substantially equal to one sixth of said period.

2. A method as recited in claim 1 wherein said maximum and minimum values of said trapezoidal waveform are substantially equal to the maximum and minimum values of said sinusoidal waveform, respectively.

3. A method as recited in claim 1 wherein said step of forming a positively sloped portion of said periodic trapezoidal waveform includes the steps of:

providing an incremental value equal to a first fraction of the difference between said maximum and minimum values;

providing a time interval equal to a second fraction of said period, wherein said second fraction is substantially equal to one third of said first fraction; and forming said signal by repetitiously adding said incremental value at each time interval until said maximum value is reached.

4. A method as recited in claim 3 wherein said step of forming said negatively sloped portion of said trapezoidal waveform comprises repetitiously subtracting said incremental value at each time interval until said minimum value is reached.

5. A method for generating dual-tone multi-frequency telephone dialing signals, said signals approximating two time varying signals having sinusoidal waveforms, said method comprising the steps of:

forming a positively sloped portion of a first periodic trapezoidal waveform having a duration substantially equal to one third of the period of a first sinusoidal waveform, wherein the strength of a first signal varies with time from a first minimum value to a first maximum value;

forming a first constant value portion of said first periodic trapezoidal waveform after said positively sloped portion and having a duration substantially equal to one sixth of the period of said first sinusoidal waveform, wherein the strength of said first signal equals said first maximum value;

forming a negatively sloped portion of said first periodic trapezoidal waveform after said first constant value portion and having a duration substantially equal to one third of the period of said first sinusoidal waveform, wherein the strength of said first signal varies with time from said first maximum value to said first minimum value;

forming a second constant value portion of said first periodic trapezoidal waveform after said negatively sloped portion and having a duration substantially equal to one sixth of the period of said first sinusoidal waveform, wherein the strength of said first signal equals said first minimum value;

forming a positively sloped portion of a second periodic trapezoidal waveform having a duration substantially equal to one third of the period of a second sinusoidal waveform, wherein the strength of a second signal varies with time from a second minimum value to a second maximum value;

forming a first constant value portion of said second periodic trapezoidal waveform after said positively sloped portion and having a duration substantially equal to one sixth of the period of said second sinusoidal waveform, wherein the strength of said second signal equals said second maximum value;

forming a negatively sloped portion of said second periodic trapezoidal waveform after said first constant value portion and having a duration substantially equal to one third of the period of said second sinusoidal waveform, wherein the strength of said second signal varies with time from said second maximum value to said second minimum value;

forming a second constant value portion of said second periodic trapezoidal waveform after said negatively sloped portion and having a duration substantially equal to one sixth of the period of said second sinusoidal waveform, wherein the strength of said second signal equals said second minimum value; and combining said first and second periodic trapezoidal waveforms to generate a dual-tone multi-frequency telephone dialing signal.

6. A method as recited in claim 5 wherein said first maximum and minimum values of said first periodic trapezoidal waveform are substantially equal to the respective maximum and minimum values of said first sinusoidal waveform.

7. A method as recited in claim 5 wherein said second maximum and minimum values of said second periodic trapezoidal waveform are substantially equal to the respective maximum and minimum values of said second sinusoidal waveform.

8. A method as recited in claim 5 wherein said first maximum value substantially equals said second maximum value, and wherein said first minimum value substantially equals said second minimum value.

9. A method as recited in claim 5 wherein said step of forming a positively sloped portion of said first periodic trapezoidal waveform includes the steps of:

providing a first incremental value equal to a first fraction of the difference between said first maximum and minimum values;

providing a first time interval equal to a second fraction of the period of said first sinusoidal waveform, wherein said second fraction is substantially equal to one third of said first fraction; and forming said first signal by repetitiously adding said first incremental value at each first time interval until said first maximum value is reached.

10. A method as recited in claim 9 wherein said step of forming said negatively sloped portion of said first trapezoidal waveform comprises repetitiously subtracting said first incremental value at each first time interval until said first minimum value is reached.

11. A method as recited in claim 9 wherein said step of forming a positively sloped portion of said second periodic trapezoidal waveform includes the steps of:

providing a second incremental value equal to a third fraction of the difference between said second maximum and minimum values;

providing a second time interval equal to a fourth fraction of the period of said second sinusoidal waveform, wherein said fourth fraction is substantially equal to one third of said third fraction; and forming said second signal by repetitiously adding said second incremental value at each second time interval until said second maximum value is reached.

12. A method as recited in claim 11 wherein said step of forming said negatively sloped portion of said second trapezoidal waveform comprises repetitiously subtracting said second incremental value at each second time interval until said second minimum value is reached.

13. A method as recited in claim 11 wherein said first and second time intervals are substantially equal in duration.

14. A method for generating a time varying signal that approximates a signal having a sinusoidal waveform, said method comprising the steps of:

forming a periodic triangular waveform having a period substantially equal to that of said sinusoidal waveform, said periodic triangular waveform having a positively sloped portion extending from a minimum value to a maximum value, and a negatively sloped portion extending from said maximum value to said minimum value, wherein said positively and negatively sloped portions have slopes of equal magnitude; and forming said signal by truncating said triangular waveform to create a trapezoidal waveform, said trapezoidal waveform having an upper constant value portion equal in value to an upper extreme value and extending for a duration substantially equal to one sixth of said period, and also having a lower constant value portion equal in value to a lower extreme value and extending for a duration substantially equal to one sixth of said period.

15. A method as recited in claim 14 wherein said step of forming a periodic triangular waveform includes the steps of:
providing a triangular incremental value equal to a first fraction of the difference between said maximum and minimum values;
providing a time interval equal to a second fraction of said period, wherein said second fraction is substantially equal to one half of said first fraction; and
forming said periodic triangular waveform by first repetitiously adding said triangular incremental value at each time interval until said maximum value is reached, and by then repetitiously subtracting said triangular incremental value at each time interval until said minimum value is reached.

16. A method as recited in claim 15 wherein said step of forming said signal by truncating said triangular waveform to create a trapezoidal waveform comprises the steps of:
expanding said triangular waveform to form an expanded waveform; and
truncating said expanded waveform at values greater than said upper extreme value and at values less than said lower extreme value.

17. A method as recited in claim 16 wherein said upper extreme value equals said maximum value and said lower extreme value equals said minimum value, and wherein said step of expanding said triangular waveform is accomplished by expanding the value of said triangular waveform by a factor substantially equal to one and one-half.

18. A method as recited in claim 14 wherein said maximum and minimum values are substantially equal to the respective maximum and minimum values of said sinusoidal waveform.

19. A digital circuit for generating a time varying signal that approximates a signal having a sinusoidal waveform, said circuit comprising:
means for forming a positively sloped portion of a periodic trapezoidal waveform, wherein the strength of said signal varies with time from a minimum value to a maximum value, and wherein the duration of said positively sloped portion is substantially equal to one third of the period of said sinusoidal waveform;
means for forming a first constant value portion of said periodic trapezoidal waveform after said positively sloped portion, wherein the strength of said signal equals said maximum value, and wherein the duration of said first constant value portion is substantially equal to one sixth of said period;
means for forming a negatively sloped portion of said periodic trapezoidal waveform after said first constant value portion, wherein the strength of said signal varies with time from said maximum value to said minimum value, and wherein the duration of said negatively sloped portion is substantially equal to one third of said period; and
means for forming a second constant value portion of said periodic trapezoidal waveform after said negatively sloped portion, wherein the strength of said signal equals said minimum value, and wherein the duration of said second constant value portion is substantially equal to one sixth of said period.

20. A circuit as recited in claim 19 wherein said means for forming a positively sloped portion of said periodic trapezoidal waveform includes means for repetitiously adding an incremental value at a succession of time intervals until said maximum value is reached, where said incremental value is equal to a first fraction of the difference between said maximum and minimum values, said time interval is equal to a second fraction of said period, and wherein said second fraction is substantially equal to one third of said first fraction.

21. A circuit as recited in claim 20 wherein said means for forming a negatively sloped portion of said trapezoidal waveform includes means for repetitiously subtracting said incremental value at each successive time interval until said minimum value is reached.

22. A digital circuit for generating a time varying signal that approximates a signal having a sinusoidal waveform, said circuit comprising:
means for periodically adding and subtracting an incremental value at a succession of time intervals to generate a periodic triangular waveform, said means including
arithmetic means for performing arithmetic operations, wherein said arithmetic means is capable of generating output signals having values not less than a minimum value and not greater than a maximum value,
a memory register coupled to said arithmetic means for temporarily storing the value of said triangular waveform,
saturation detection means coupled to said arithmetic means for indicating saturation when said arithmetic means reaches either its maximum or minimum value; and
control means for periodically directing said arithmetic means to increment the value of said triangular waveform by an incremental value, and for changing the sign of said incremental value when accumulator saturation is detected, wherein the magnitude of said incremental value is chosen such that the period of said signal is equal to the period of said sinusoidal waveform; and
means for truncating said triangular waveform to form a trapezoidal waveform, wherein said time varying signal equals the time varying value of said trapezoidal waveform.

23. A circuit as recited in claim 22 wherein said incremental value equals a first fraction of the difference between said maximum and minimum values, wherein each of said time intervals equals a second fraction of said period, and wherein said second fraction is substantially equal to one half of said first fraction.

24. A circuit as recited in claim 22, wherein said means for generating said signal by truncating said triangular waveform to form a trapezoidal waveform is provided by said arithmetic and control means, wherein said arithmetic means multiplies said value of said triangular waveform by a multiplier to form said signal and truncates said signal at said minimum and maximum values to form said trapezoidal waveform.

25. A circuit as recited in claim 24 wherein said multiplier is substantially equal to one and one-half.

26. A digital circuit for generating a time varying signal having a trapezoidal waveform approximating a signal having a sinusoidal waveform, said circuit comprising:

arithmetic means for performing arithmetic operations, wherein said arithmetic means is capable of generating digital values not less than a minimum value and not greater than a maximum value;

a memory register coupled to said arithmetic means for temporarily storing the value of a triangular waveform;

saturation detection means coupled to said arithmetic means for indicating saturation when said arithmetic means reaches either its maximum or minimum value; and control means for periodically directing said arithmetic means to increment the value of said triangular waveform by an incremental value and to multiply the value of said triangular waveform by a multiplier to yield said signal, and for changing the sign of said incremental value when accumulator saturation occurs during incrementation, wherein the magnitude of said incremental value is chosen such that the period of said signal is equal to the period of said sinusoidal waveform.

27. A circuit as recited in claim 26 wherein said incremental value is substantially equal to twice the difference between said maximum and minimum values divided by the number of said time intervals within said period.

28. A circuit as recited in claim 26 wherein said arithmetic means comprises an arithmetic and logic unit (ALU), an accumulator, and a shifter.

29. A circuit as recited in claim 26 further comprising means for attenuating said signal by dividing by a divisor.

* * * * *